United States Patent Office 3,814,721
Patented June 4, 1974

3,814,721
NONAQUEOUS DISPERSIONS OF THERMOSET-
TING FILM FORMING COPOLYMERS OF
ETHENIC MONOMERS
David L. Maker and Stephen C. Peng, Rochester, Mich.,
assignors to Ford Motor Company, Dearborn, Mich.
No Drawing. Filed Mar. 1, 1971, Ser. No. 120,045
Int. Cl. C08g 51/28, 51/32, 53/18
U.S. Cl. 260—33.6 R                                  4 Claims

ABSTRACT OF THE DISCLOSURE

A solution of a pecursor addition copolymer is prepared by reacting an active ethenic monomer having a functional epoxy, hydroxy, cyanato or carboxy group with another active ethenic monomer free of functional-groups in an aromatic or alcoholic solvent. A miscible aliphatic liquid is added and a second addition copolymer then is produced by reacting in the mixture a third ethenic monomer having one of such functional groups and a fouth ethenic monomer free of such functional groups. The aliphatic liquid is a nonsolvent for the second addition copolymer which is dispersed through the liquid medium. A melamine-formaldehyde resin having a mineral spirits tolerance of 250 or greater is added. Curing coatings of the dispersion produces thermosetting films having an excellent combination of protective and decorative properties.

SUMMARY OF THE INVENTION

This application relates to the subject matter of U.S. patent application Maker et al. Ser. No. 82,130, filed Oct. 19, 1970, and now abandoned in favor of continuation-in-part application Ser. No. 240,789, filed Apr. 3, 1972 under the same title and entitled, "Nonaqueous Dispersions of Thermosetting Film Forming Polymers," and U.S. patent application Maker et al. Ser. No. 120,044, entitled, "Nonaqueous Dispersions of Thermosetting Film Forming Copolymers of Amides of Unsaturated Acids," filed Mar. 1, 1971.

Nonaqueous dispersions of film forming polymers have been developed in recent years in attempts to improve the efficiency of applying protective or decorative coatings to a variety of objects such as vehicle bodies and other vehicle components. Such dispersions can carry a greater percentage of solids than the previously used solutions and thus reduce the amount of lost volatiles. The dispersions also reduce the number of coats necessary to obtain desired film thicknesses.

Preparing nonaqueous dispersions capable of producing thermosetting films is a difficult task, however. Highly alkylated amino resins having high mineral spirits tolerance have been an essential ingredient of the dispersions, and it can be difficult to achieve satisfactory quality and uniformity of such resins in economical mass production. Moreover, the high degree of alkylation requires higher curing times or longer curing temperatures. Prior art dispersions typically require block or graft copolymers that provide dispersion stability but diminish final film properties; many of these in fact produce only thermoplastic films although some reportedly achieve thermoset properties through the use of a trimer system in which one monomer group exists only in one phase and is attached by an intermediate monomer group to a third monomer group that exists only in another phase. The concurrently filed Maker et al. application discloses one approach to these problems that comprises preparing crosslinkable nonaqueous dispersions containing a methylolated addition copolymer of acrylamide or methacrylamide and an ethenic monomer which do not require the highly alkylated amino resins to achieve satisfactory dispersion stability and final film gloss, durability, and protectiveness.

This invention provides nonaqueous dispersions capable of producing thermosetting films having gloss, durability, protectiveness and other properties suitable for automotive finishes and numerous other applications. The dispersions obviate many of the preparation problems encountered with prior compositons capable of producing similar results.

To produce the dispersions of this invention, a solution of a precursor addition copolymer is first prepared by copolymerizing in a liquid solvent a first active ethenic monomer and a second active ethenic monomer, each of which preferably has at least 4 carbon atoms and one of which has at least 11 carbon atoms. One of the monomers also has a functional group. A miscible aliphatic liquid is added to the solution and a second addition copolymer then is produced by copolymerizing in the liquid medium a third active ethenic monomer and a fourth active ethenic monomer, one of which also has a functional group. The miscible aliphatic liquid is a nonsolvent for the second addition copolymer. Sufficient aliphatic nonsolvent is added to insure that the second addition copolymer is insoluble in and dispersed through the liquid medium. An amino resin having a mineral spirits tolerance of about 250 or greater then is added to the dispersion. During final film curing, the functional groups of the addition copolymers react with the amino resin to produce a highly crosslinked structure.

Aromatic or alcoholic liquids such as xylene, benzene, toluene, butanol, propanol, isopropanol, ethanol, hexanol, etc. preferably serve as the solvent for the precusor copolymer. Useful aliphatic nonsolvents include aliphatic distillation products such as naphthas. Aliphatic naphthas having distillation ranges above 85° C. are most practical and naphthas having a distillation range of about 100–150° C. are preferred because of rapid polymerization rates at refluxing temperatures plus excellent temperature control. Cyclohexane, cycloheptane, cyclooctane, n-octane, isooctane, nonane and other straight, branched or cyclic aliphatic hydrocarbons or mixtures also can be used. The aromatic or alcoholic solvent and the aliphatic nonsolvent make up the liquid medium, with the aliphatic nonsolvent generally being the major portion thereof. Aliphatic nonsolvent preferably forms as close to 100 percent of the liquid medium as is practical. Liquid mediums containing 90 weight percent aliphatic nonsolvent are relatively easy to obtain and provide good results.

Active ethenic monomers useful in the invention are monomers readily polymerized by free radial initiators. Such monomers preferably have an activating group such as an esterified carboxyl radical near the carbon-carbon double bond. Active ethenic monomers useful in forming the precursor copolymer include butyl acrylate and methacrylate, 2-ethylhexyl acrylate and methacrylate, lauryl methacrylate, stearyl methacrylate, tridecyl methacrylate, and acrylates and methacrylates having an inclusive number of carbon atoms. Hydroxy, epoxy, cyanato, and carboxyl groups serve efficiently as the functional groups of the precursor copolymer. Active ethenic monomers that have appropriate functional groups include hydroxypropyl acrylate and methacrylate, hydroxyethyl acrylate and methacrylate, hydroxybutyl acrylate and methacrylate, 2,3-epoxypropyl acrylate and methacrylate, 3,4-epoxybutyl acrylate and methacrylate, 5,6-epoxyhexyl acrylate and methacrylate, 4-epoxyethyl styrene, 2-cyanatoethyl acrylate and methacrylate, methacrylic acid, crotonic acid, 3-butenoic acid, etc. Functional monomers preferably make up about 5 to 50 weight percent of the precursor copolymer. The precursor copolymer preferably has a mineral spirits tolerance at 75 percent solids in butanol of at least 1000 (ASTM D1198–55). Best final film properties are obtained when monomers for the precursor copolymer contain less than about 22 carbon atoms.

A wider variety of monomers can be used to make the second addition copolymer. Such monomers include methyl acrylate, methyl methacrylate, ethyl acrylate, ethyl methacrylate, butyl acrylate, butyl methacrylate, propyl acrylate, propyl methacrylate, 2-ethylhexyl acrylate, vinyl chloride, vinylidene chloride, vinyl acetate, styrene, alpha methyl styrene, vinyl toluene, acrylonitrile, methacrylonitrile, acrylamide, and methacrylamide. Ethenic monomers for the second copolymer preferably have a lower number of carbon atoms, usually less than about 12, because these react more effectively and produce dispersions having better stability and final film properties.

The functional active ethenic monomers used in the precursor copolymer also can be used in the second addition copolymer although functional monomers having a lower number of carbon atoms are preferred. Functional monomers preferably make up about 5 to 50 weight percent of the second copolymer.

Mixtures of several appropriate ethenic monomers can be used in both the precursor copolymer and the second copolymer to produce a combination of final film and dispersion properties. Preferred monomers of the precursor copolymer have a relatively high number of carbon atoms while preferred monomers for the second copolymer have a relatively low number of carbon atoms. Acrylonitrile preferably forms up to 40 weight percent of the second copolymer because its dispersions are highly stable.

Polymerizations preferably are carried out with constant stirring. Relatively high polymerization temperatures can be used although temperatures above about 150° C. should be avoided to prevent thermal damage to the polymers. A liquid medium having a reflux temperature close to desired polymerization temperature is preferred because of the automatic maximum temperature control provided thereby.

After dispersion formation, an amine resin such as melamine-formaldehyde or urea-formaldehyde is added. The amino resin usually makes up about 5–50 weight percent of the polymer content, with best results being obtained at about 20–30 weight percent. Amino resins having mineral spirits tolerances as low as about 250 at 60 percent solids in a 1:1 mixture of xylene and butanol (ASTM D1198–55) can be used. The amino resin usually is added as a miscible solution.

Clear, protective, thermoset films are produced by curing coatings of the dispersions. Curing usually is effected at temperatures of about 100–150° C. During curing, the functional groups of the addition copolymers react with the amino resin to produce a highly crosslinked structure. Pigments can be added to the dispersions as desired.

Dispersions of the invention, can be made with solids contents up to 60 weight percent. Paints made from the dispersions have excellent shelf life and stability, and typically have solids contents (pigment and film forming ingredients) of over 40 weight percent. Automotive topcoats can be produced by spray applications from the paints having solids as high as 60 weight percent.

DETAILED DESCRIPTION

Example 1

A precursor addition copolymer having functional hydroxy groups is prepared in the following manner. One hundred ninety grams of butanol is charged into a 4 liter flask equipped with a water condenser, thermometer, stirrer and dropping funnel and heated to refluxing at 118° C. A mixture of 420 grams 2-ethylhexyl acrylate, 180 grams hydroxypropyl methacrylate (30 percent of monomers) and 4 grams of tertiary butyl peroctoate is added dropwise over a 3 hour period while maintaining refluxing. One hour after the addition, a mixture of 10 grams butanol and 2 grams tertiary butyl peroctoate is added and the mixture is agitated under refluxing for an additional 2 hours. A clear solution having a Gardner-Holdt viscosity of Z2, a solids content of 73.9 percent and an acid value of 6.2 results. Its mineral spirits tolerance measured by ASTM D1198–55 is in excess of 1700.

A dispersion is prepared by charging 203 grams of the solution and 387 grams of aliphatic naphtha having a distillation range of 116–146° C. into the apparatus described above. The mixture is heated to refluxing. With constant stirring and refluxing, an ethenic monomer mixture of 105 grams styrene, 80.5 grams butyl methacrylate, 52.5 grams methylmethacrylate, 52.5 grams acrylonitrile, 52.5 grams hydroxypropyl methacrylate (15 percent of monomers), 7 grams acrylic acid, 50 grams of the aliphatic naphtha and 3.5 grams of tertiary butyl peroctoate is added dropwise over a period of 5 hours. Refluxing and stirring are continued for another hour after which 10 grams of the aliphatic naphtha and one gram of tertiary butyl peroctoate is added. Refluxing and stirring are continued for an additional hour. The resulting milky white dispersion has a solids content of 46.9 percent, a viscosity of 15 seconds in a number 4 Ford cup and an acid value of 15.5.

One hundred grams of the dispersion is mixed with 34 grams of a 60 percent solution of alkylated melamine-formaldehyde resin having a mineral spirits tolerance of 250–350 in a 1:1 mixture of xylene and butanol and 16 grams of a mixed solvent consisting of aliphatic and aromatic hydrocarbons that assist in coalescing the dispersion during final film curing. Baking a coating of the mixture 17 minutes at 129° C. produces a clear, durable, solvent resistant thermoset film.

EXAMPLE 2

Using the apparatus and procedure of Example 1, a precursor copolymer is prepared from 360 grams 2-ethylhexyl acrylate, 60 grams butyl methacrylate, 60 grams styrene, 108 grams hydroxypropyl methacrylate (18 percent of monomers), and 12 grams acrylic acid (2 percent of monomers). The resulting solution has a solids content of 73.6 percent, a Gardner-Holdt viscosity of Z5, an acid value of 18.8 and a mineral spirits tolerance exceeding 1700.

A dispersion is prepared in the manner of Example 1 except that the styrene amount is 90 grams and the butyl methacrylate amount is 95 grams. The resulting dispersion contains 48.4 percent solids, has a viscosity of 28.7 seconds in a number 4 Ford cup and has an acid value of 21.3. Baking blends of 70 parts of the dispersion with 30 parts of alkylated melamine-formaldehyde resin at 265° F. for 17 minutes produces a hard, clear, mar resistant and solvent resistant thermoset film.

EXAMPLE 3

Three hundred thirty-three grams of the precursor solution of Example 1 and three hundred fifty-seven grams of aliphatic naphtha (distillation range 116–146° C.) is charged into the apparatus of Example 1 and raised to reflux temperature of 117° C. A second mixture of 75 grams styrene, 58 grams butyl methacrylate, 37 grams methyl methacrylate, 37 grams acrylonitrile, 37 grams hydroxypropyl methacrylate, 5 grams acrylic acid, 50 grams aliphatic naphtha (distillation range 116–146° C.) and 3.0 grams of tertiary butyl peroctoate is added dropwise over a 5 hour period while maintaining reflux. One hour after the completion of this addition, a mixture of 10 grams of the aliphatic naphtha and 0.25 grams of tertiary butyl peroctoate is added. The reaction is held at reflux temperature an additional hour and the resulting product is a milky white dispersion of 46.1 percent solids, a viscosity of 27.5 seconds (No. 4 Ford Cup) and an acid value of 13.4. One hundred parts of this product is mixed with 34 parts of an alkylated melamine-formaldehyde resin (MST 250–350 at 60 percent solids in 1:1 mixture of xylene and butanol) and 16 grams of a hydrocarbon solvent. Baking 17 minutes at 265° F. produces a hard, mar resistant and solvent resistant thermoset film.

EXAMPLE 4

Example 2 is repeated except that the monomers for preparing the dispersion are 90 grams styrene, 95 grams butyl methacrylate, 70 grams methyl methacrylate, 52.5 grams of acrylonitrile, 35 grams of hydroxypropyl methacrylate, 7 grams of acrylic acid, 50 grams of aliphatic naphtha (distillation range 116–146° C.), and 3.5 grams tertiary butyl peroctoate. The product is a milky white dispersion having a viscosity of 25.9 seconds in a No. 4 Ford Cup, 48.6 percent solids, and an acid value of 23.0. The dispersion has excellent stability. Blending 70 parts with 30 parts of an alkylated melamine-formaldehyde resin and baking 17 minutes at 265° F., produces a hard, clear, mar and solvent resistant thermoset film.

Thus this invention provides a nonaqueous dispersion made entirely of ethenic monomers and curable into thermoset films. The films are useful for protective and decorative purposes on a wide variety of products.

What is claimed is:

1. A process for preparing a non-aqueous dispersion of a thermosetting film-forming polymer comprising:
    preparing from a first ethenic monomer and a second ethenic monomer in a solvent a solution of a precursor addition copolymer having a mineral spirits tolerance at 75 percent solids in butanol of at least 1000, each of said ethenic monomers having at least 11 carbon atoms, one of said ethenic monomers having an epoxy, hydroxy, cyanato or carboxy functional group,
    mixing with said solution an aliphatic liquid miscible therewith and in sufficient quantity to form the major portion of the resulting liquid medium,
    copolymerizing in the liquid medium a third ethenic monomer and a fourth ethenic monomer to produce a second addition copolymer insoluble in and dispersed through the liquid medium, said miscible aliphatic liquid being a nonsolvent for said second addition copolymer, said third ethenic monomer having an epoxy, hydroxy, cyanato or carboxy functional group and said fourth ethenic monomer being free of functional groups, and
    blending with said dispersion an amino resin having a mineral spirits tolerance at 60 percent solids in a 1:1 mixture of xylene and butanol of at least about 250.

2. The process of claim 1 in which the miscible aliphatic liquid is an aliphatic naphtha and the mixing step comprises mixing sufficient aliphatic naphtha with the solution so the aliphatic naphtha forms at least 90 weight percent of the resulting liquid medium.

3. The process of claim 2 in which said third ethenic monomer and said fourth ethenic monomer each has less than about 12 carbon atoms.

4. The process of claim 3 in which the blending step comprises adding a miscible solution of an amino resin with the dispersion.

References Cited

UNITED STATES PATENTS

| | | | |
|---|---|---|---|
| 3,365,414 | 1/1968 | Fisk et al. | 260—33.4 |
| 3,382,297 | 5/1968 | Thompson | 260—34.2 |
| 3,405,087 | 10/1968 | Fryd | 260—34.2 |
| 3,474,061 | 10/1969 | Von Bonin et al. | 260—34.2 |
| 3,632,789 | 1/1972 | Wilhelm et al. | 260—33.6 UB |
| 3,557,048 | 1/1971 | Wilhelm et al. | 260—34.2 |
| 3,640,931 | 2/1972 | Clarke et al. | 260—34.2 |

ALLAN LIEBERMAN, Primary Examiner

U.S. Cl. X.R.

260—33.4 R, 33.4 EP, 33.6 EP, 34.2